(12) United States Patent
Kurabayashi

(10) Patent No.: US 11,281,908 B2
(45) Date of Patent: Mar. 22, 2022

(54) SYSTEM, SERVER, PROGRAM, AND METHOD FOR CONFIRMING ACQUISITION OF TARGET OBJECT

(71) Applicant: CYGAMES, INC., Tokyo (JP)

(72) Inventor: Shuichi Kurabayashi, Tokyo (JP)

(73) Assignee: CYGAMES, INC., Tokyo (JP)

(*) Notice: Subject to any disclaimer, the term of this patent is extended or adjusted under 35 U.S.C. 154(b) by 58 days.

(21) Appl. No.: 16/843,485

(22) Filed: Apr. 8, 2020

(65) Prior Publication Data

US 2020/0242362 A1 Jul. 30, 2020

Related U.S. Application Data

(63) Continuation of application No. PCT/JP2018/037779, filed on Oct. 10, 2018.

(30) Foreign Application Priority Data

Oct. 10, 2017 (JP) .............................. JP2017-196974

(51) Int. Cl.
*G06K 9/00* (2006.01)
*G06K 9/46* (2006.01)
*G06Q 30/02* (2012.01)

(52) U.S. Cl.
CPC ....... *G06K 9/00671* (2013.01); *G06K 9/4642* (2013.01); *G06K 9/4652* (2013.01); *G06Q 30/0207* (2013.01)

(58) Field of Classification Search
CPC ........... G06T 7/001; G06T 7/593; G06T 7/85; G06T 7/73; G06T 2207/10024;
(Continued)

(56) References Cited

U.S. PATENT DOCUMENTS

2009/0272801 A1* 11/2009 Connell, II ........ G06K 7/10792
235/383
2010/0059589 A1* 3/2010 Goncalves ............... G06K 5/00
235/383
(Continued)

FOREIGN PATENT DOCUMENTS

JP 2010-262601 A 11/2010
JP 2013-054529 A 3/2013
(Continued)

OTHER PUBLICATIONS

International Search Report issued in Application No. PCT/JP2018/037779, dated Jan. 8, 2019 (5 pages).
Written Opinion issued in International Application No. PCT/JP2018/037779, dated Jan. 8, 2019 (5 pages).

*Primary Examiner* — Duy M Dang
(74) *Attorney, Agent, or Firm* — Osha Bergman Watanabe & Burton LLP

(57) ABSTRACT

Provided is a system for confirming that one kind of target object has been acquired, the system including a portable terminal device and a server, wherein the portable terminal device classifies, based on local features about shapes for detecting the plurality of kinds of target objects, whether one kind of target object is included in an image of a space captured by an image-capturing device of the portable terminal device, captures, as an acquired target-object image, the image classified as including the target object, and sends the acquired target-object image to the server, and wherein the server receives the acquired target-object image, determines, based on image features of one kind of target object, a feature correlation level of the acquired target-object image in relation to that target object, and classifies whether the acquired target-object image is an image in which the one kind of target object is captured.

12 Claims, 13 Drawing Sheets

(58) Field of Classification Search
CPC .......... G06T 11/40; G06T 2207/20228; G06T 2207/30201; G06T 2207/10021; G06T 11/00; G06T 3/4038; G06T 7/00; G06T 7/74; G06T 7/248; G06T 7/90; G01S 13/90; G01S 17/89; G06K 9/6202; G06K 9/6279; G06K 9/0063; G06K 9/4652; G06K 9/4661; G06K 9/629; G06K 9/00671; G06K 2209/25; G06K 2209/17; G06K 2209/00624; H04N 13/128; H04N 13/194; H04N 2013/0081; H04N 13/243; G06F 3/013; G06Q 30/0207
See application file for complete search history.

(56) References Cited

U.S. PATENT DOCUMENTS

| | | | |
|---|---|---|---|
| 2012/0063674 | A1 | 3/2012 | Yano |
| 2014/0010464 | A1* | 1/2014 | Umeda .................. G06T 11/60 382/224 |
| 2014/0147023 | A1 | 5/2014 | Lee et al. |
| 2014/0177918 | A1* | 6/2014 | Boncyk ............. G06F 16/24554 382/103 |
| 2020/0026921 | A1 | 1/2020 | Kurabayashi |

FOREIGN PATENT DOCUMENTS

| | | |
|---|---|---|
| JP | 2016-006679 A | 1/2016 |
| JP | 6181893 B1 | 8/2017 |

* cited by examiner

SYSTEM, SERVER, PROGRAM, AND METHOD FOR CONFIRMING ACQUISITION OF TARGET OBJECT

TECHNICAL FIELD

The present invention relates to a system, a server, a program, and a method for confirming that a user has acquired a target object.

BACKGROUND ART

There are known check-in services in which privileges in online games or the like are awarded to users who have visited predetermined places, such as shops. In a system disclosed in Patent Literature 1, when providing a service in which a privilege in an online game or the like is awarded to a user of a portable terminal device who has visited a place where predetermined posted material is posted, if the posted material is classified as being included within an image-capturing area on the basis of a reference image, which is an image of the posted material stored in a portable-terminal storage unit, an image of the posted material as well as a surrounding portion thereof is captured, a normalized image obtained by normalizing this image is compared with authenticated images already authenticated and stored in a server, and the visit by the user is confirmed on the basis of the similarity therebetween.

CITATION LIST

Patent Literature

{PTL 1}
Japanese Patent Publication No. 6181893

SUMMARY OF INVENTION

Technical Problem

However, the purpose of the system is to confirm a visit to a predetermined place. Thus, the system is not necessarily suitable for accurately identifying the kind of a target object for which a privilege is to be awarded, such as a product, for the purpose of a check-in service in which a user who has purchased or otherwise acquired a product is confirmed and a privilege is awarded.

It becomes possible to identify the kind of a product in a captured image if two-dimensional codes identifying the kinds of products are attached to product packages or the like. However, in order to identify the kinds of products by using two-dimensional codes, it is necessary that two-dimensional codes that vary among individual products are displayed on paper wrappers or the like. Since it would considerably increase the unit price to change the designs of existing paper wrappers and to print two-dimensional codes thereon, it is difficult to realize this for an event or the like having a limited period. Furthermore, in the case where two-dimensional codes identifying individual products or the like are attached to existing paper wrappers, the unit price would considerably increase due to that work, and it would be necessary to change the manufacturing and distribution paths of the products, which is not feasible.

Solution to Problem

The present invention has been made in view of the problems described above and has the following features.

Specifically, a system according to an embodiment of the present invention is a system for confirming that one kind of target object among a plurality of kinds of target objects has been acquired, the system including a portable terminal device and a server, the system being characterized in that the portable terminal device classifies, on the basis of local features about shapes for detecting the plurality of kinds of target objects, whether or not one kind of target object among the plurality of kinds of target objects is included in an image of a space captured by an image-capturing device of the portable terminal device, if the image is classified as including one kind of target object, captures, as an acquired target-object image, the image classified as including the target object, and sends the acquired target-object image to the server, and the server receives the sent acquired target-object image, determines, on the basis of image features of one kind of target object among the plurality of kinds of target objects, a feature correlation level of the acquired target-object image in relation to the one kind of target object, and classifies, on the basis of the determined feature correlation level, whether or not the acquired target-object image is an image in which the one kind of target object is captured.

The image features of the one kind of target object may include singular features and non-singular features, the singular features may include characteristic color values representing colors that are characteristic of the one kind of target object, the non-singular features may include non-characteristic color values representing colors that are not characteristic of the one kind of target object, the feature correlation level may be the ratio between the amount of characteristic portions determined as representing the colors characteristic of the one kind of target object and the amount of non-characteristic portions determined as representing the colors not characteristic of the one kind of target object on the basis of the image features of the one kind of target object in the acquired target-object image, and the classification as to whether or not the acquired target-object image is an image in which the one kind of target object is captured may be determined according to whether or not the feature correlation level falls within a predetermined range.

The non-singular features may include at least either of color values representing colors that are common to the plurality of kinds of target objects and color values not included in the singular features of the one kind of target object and included in the singular features of other kinds of target objects.

The image features of the one kind of target object may include a histogram about a shape included in a reference image of that kind of target object, and the feature correlation level may be determined on the basis of the difference between the histogram of the reference image and a histogram about a shape included in the acquired target-object image.

The classification as to whether or not one kind of target object among the plurality of kinds of target objects is included in an image of a space captured by the image-capturing device of the portable terminal device may be classification as to whether or not the one kind of target object is included within a predetermined area in the image of the captured space.

One kind among the plurality of kinds of target objects may be designated by a user in advance via the portable terminal device.

The classification as to whether or not the acquired target-object image is an image in which the one kind of target object is captured may be performed for each of the plurality of kinds of target objects, and the acquired target-object image may be determined as being an image in which a target object having the highest correlation is captured.

The local features may be local features that are common to the plurality of kinds of target objects or local features that are unique to each of the plurality of kinds of target objects.

Furthermore, a server according to an embodiment of the present invention is a server that is used in a system for confirming that one kind of target object among a plurality of kinds of target objects has been acquired, the server being characterized in that the server receives, from a portable terminal device, an acquired target-object image classified as including a target object captured by the portable terminal device, determines, on the basis of image features of one kind of target object among the plurality of kinds of target objects, a feature correlation level of the acquired target-object image in relation to the one kind of target object, and classifies, on the basis of the determined feature correlation level, whether or not the acquired target-object image is an image in which the one kind of target object is captured.

Furthermore, a set of programs according to an embodiment of the present invention is a set of programs for confirming that one kind of target object among a plurality of kinds of target objects has been acquired, the programs causing one or more computers to execute a step of classifying, on the basis of local features about shapes for detecting the plurality of kinds of target objects, whether or not one kind of target object among the plurality of kinds of target objects is included in an image of a space captured by an image-capturing device of a relevant portable terminal device, a step of capturing, if the image is classified as including one kind of target object, the image classified as including the target object as an acquired target-object image, a step of determining, on the basis of image features of one kind of target object among the plurality of kinds of target objects, a feature correlation level of the acquired target-object image in relation to the one kind of target object, and a step of classifying, on the basis of the determined feature correlation level, whether or not the acquired target-object image is an image in which the one kind of target object is captured.

A program according to an embodiment of the present invention is a program for confirming that one kind of target object among a plurality of kinds of target objects has been acquired, the program causing a server to execute receiving, from a portable terminal device, an acquired target-object image classified as including a target object captured by the portable terminal device, determining, on the basis of image features of one kind of target object among the plurality of kinds of target objects, a feature correlation level of the acquired target-object image in relation to the one kind of target object, and classifying, on the basis of the determined feature correlation level, whether or not the acquired target-object image is an image in which the one kind of target object is captured.

A method according to an embodiment of the present invention is a method for confirming that one kind of target object among a plurality of kinds of target objects has been acquired, wherein one or more computers are caused to execute a step of classifying, on the basis of local features about shapes for detecting the plurality of kinds of target objects, whether or not one kind of target object among the plurality of kinds of target objects is included in an image of a space captured by an image-capturing device of a relevant portable terminal device, a step of capturing, if the image is classified as including one kind of target object, the image classified as including the target object as an acquired target-object image, a step of determining, on the basis of image features of one kind of target object among the plurality of kinds of target objects, a feature correlation level of the acquired target-object image in relation to the one kind of target object, and a step of classifying, on the basis of the determined feature correlation level, whether or not the acquired target-object image is an image in which the one kind of target object is captured.

A method according to an embodiment of the present invention is a method for confirming that one kind of target object among a plurality of kinds of target objects has been acquired, wherein a server is caused to execute receiving, from a portable terminal device, an acquired target-object image classified as including a target object captured by the portable terminal device, determining, on the basis of image features of one kind of target object among the plurality of kinds of target objects, a feature correlation level of the acquired target-object image in relation to the one kind of target object, and classifying, on the basis of the determined feature correlation level, whether or not the acquired target-object image is an image in which the one kind of target object is captured.

Advantageous Effects of Invention

The present invention makes it possible to realize, at low cost, a system that identifies the kind of a target object acquired by a user from among a plurality of kinds of target objects, such as products, to confirm that the user has acquired that target object.

DESCRIPTION OF EMBODIMENTS

Figure 1:
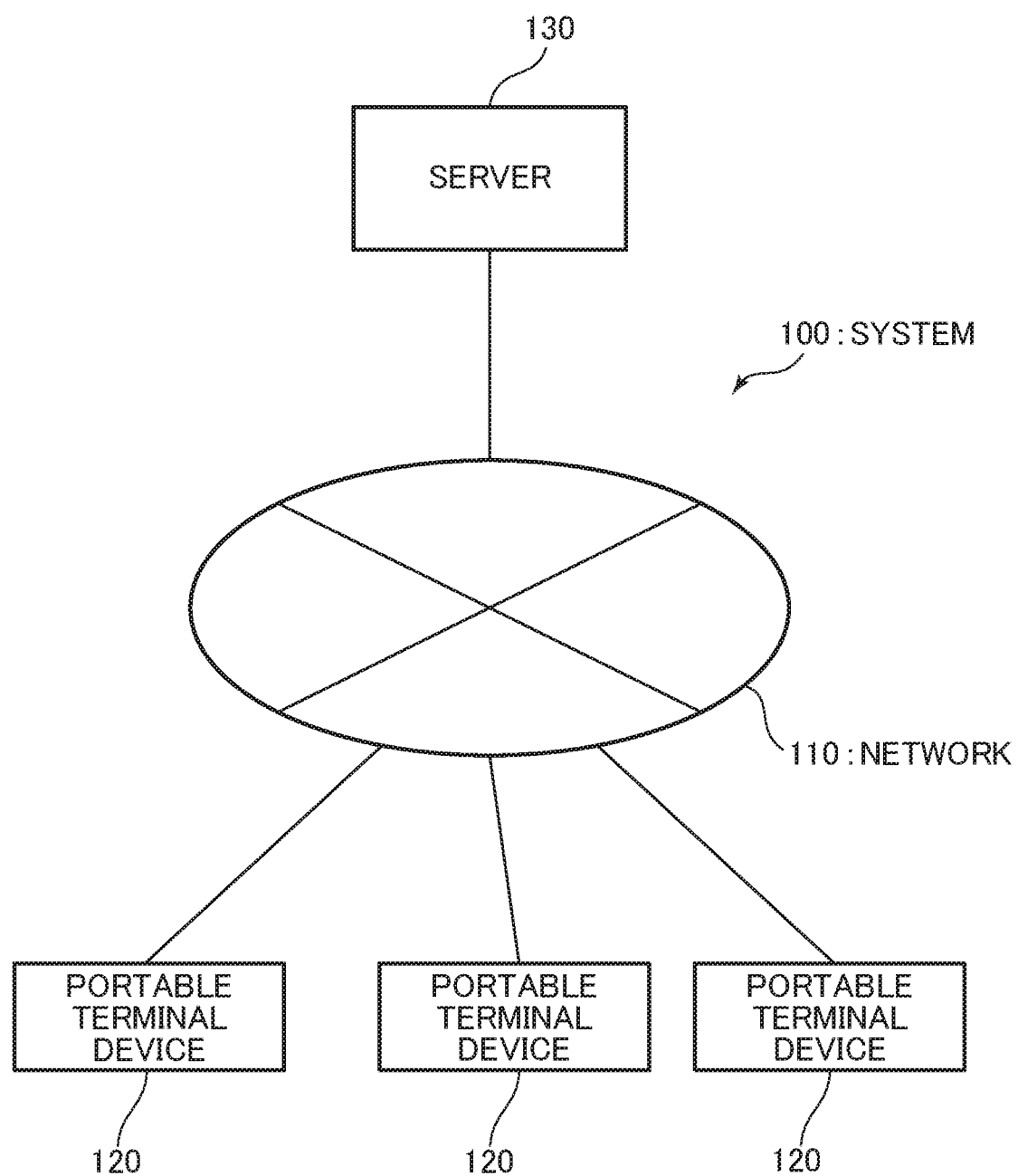
FIG. 1 shows the overall configuration of a system according to an embodiment of the present invention.

An embodiment of the present invention will be described below with reference to the drawings. As shown in FIG. 1, a target-object acquisition confirmation system 100 according to this embodiment can be realized by a system including one or more portable terminal devices 120 and a server 130 connected via a network 110. Target objects may be of any kind as long as it is possible to confirm that a user has acquired such an object. In this embodiment, target objects are products that are subject to a check-in service, and when it is confirmed that a user of an online game has purchased and acquired such a product at a shop, an item in the online game, corresponding to the product, is awarded as a privilege. Target objects need not necessarily be products, and may be, for example, cards or the like distributed for free at an event.

Each of the portable terminal devices 120 in this embodiment is a device that captures an image of a target object and that sends the captured image to the server 130 via the network 110. The portable terminal device 120 may be a portable device such as a mobile phone, a smartphone, a tablet terminal, a portable game machine, or a digital camera. The portable terminal device 120 includes a processing device 201, a display device 202, an input device 203, an image-capturing device 204, a position-information obtaining device 205, a storage device 206, a communication device 207, and a bus 208. The storage unit 206 stores programs 209.

The processing device 201 executes applications, such as a web browser, and executes various kinds of processing, such as image processing, on the basis of the programs 209, data input from the input device 203, captured image data from the image-capturing device 204, data received from the position-information obtaining device 205 or the communication device 207, etc. The processing device 201 includes a processor that controls the individual devices included in the portable terminal device 120, and executes various kinds of processing by using a register included in the processor or the storage device 206 as a work area. These components are connected via the bus 208; alternatively, however, the components may be connected individually as needed.

The display device (display) 202 displays application screens or images captured by the image-capturing device 204 under the control of the processing device 201. The display device 202 is preferably a liquid crystal display but may be an organic-EL-based display, a plasma display, or the like.

The input device 203 is a device having functionality for accepting input from a user, such as a touchscreen, a touchpad, or input buttons. In the case where the portable terminal device 120 includes a touchscreen as the input device 203, the touchscreen also functions as the display device 202, and the display device 202 and the input device 203 are constructed in an integrated form. The display device 202 and the input device 203 may be disposed at separate positions in separate forms. The image-capturing device 204 captures a still picture or a moving picture of a real space region. The position-information obtaining device 205 is a device that obtains information indicating the current position of the portable terminal device, and may be, for example, a GPS sensor or a device that identifies the position on the basis of a WiFi SSID or the like.

The storage device 206 includes a hard disk, a main memory, and a buffer memory. Alternatively, any type of non-volatile storage or non-volatile memory that is capable of storing information, which may be of the removable type, may be used in place of the hard disk. For example, in the case where the portable terminal device 120 is a smartphone, the storage device 206 includes a ROM and a RAM. The storage device 206 stores the programs 209 and various kinds of data that can be referred to as the programs are executed. The programs 209 may include an operating system as well as programs and data for any kind of application requiring input from a player, such as a video game or a web browser.

The communication device 207 carries out wireless communications such as mobile communications or wireless LAN communications or wired communications via an Ethernet (registered trademark) cable, a USB cable, or the like. The communication device 207 makes it possible to download programs from the server 130 and to store the programs in the storage device 206. Alternatively, programs may be stored in an optical disk such as a CD or a DVD, and by connecting an optical drive to the communication device 207, programs, etc. may be read from the optical disk and stored in the storage device 206.

Figure 3:
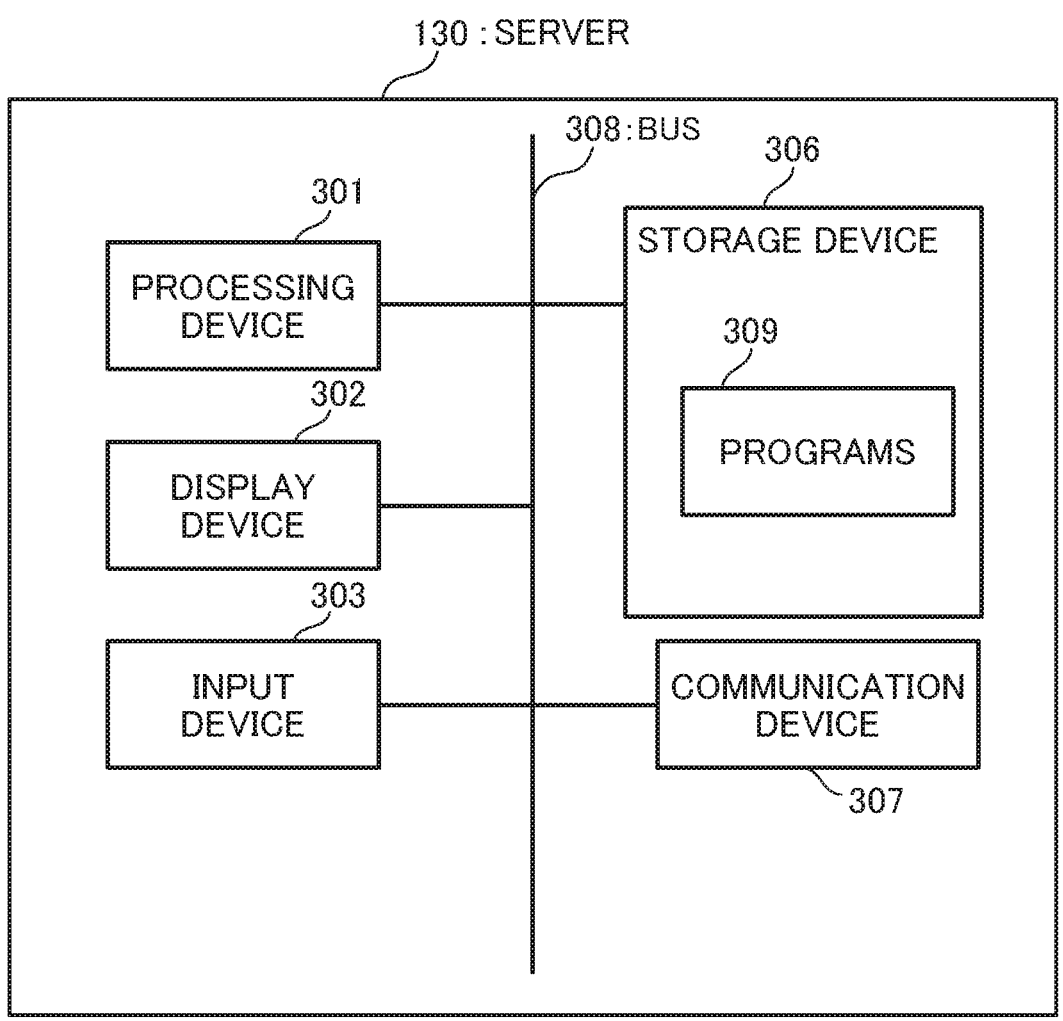
FIG. 3 is a hardware configuration diagram of a server according to the embodiment of the present invention.

FIG. 3 is a block diagram showing the hardware configuration of the server 130 according to this embodiment. The server 130 includes a processing device 301, a display device 302, an input device 303, a storage device 306, and a communication device 307. These components are connected via a bus 308; alternatively, however, the components may be connected individually as needed.

The processing device 301 includes a processor that controls the individual devices included in the server 130, and executes various kinds of processing by using the storage device 306 as a work area. The display device 302 has functionality for displaying information to a user of the server. The input device 303 is a device having functionality for accepting input from the user, such as a keyboard or a mouse.

The storage device 306 includes a hard disk, a main memory, and a buffer memory. The hard disk stores programs 309. Alternatively, any type of non-volatile storage or non-volatile memory that is capable of storing information, which may be of the removable type, may be used in place of the hard disk. The storage device 306 stores the programs 309 and various kinds of data that can be referred to as the programs are executed.

The communication device 307 carries out wired communications via an Ethernet (registered trademark) cable or the like or wireless communications such as mobile communications or wireless LAN communications to connect to the network 110.

Figure 4:
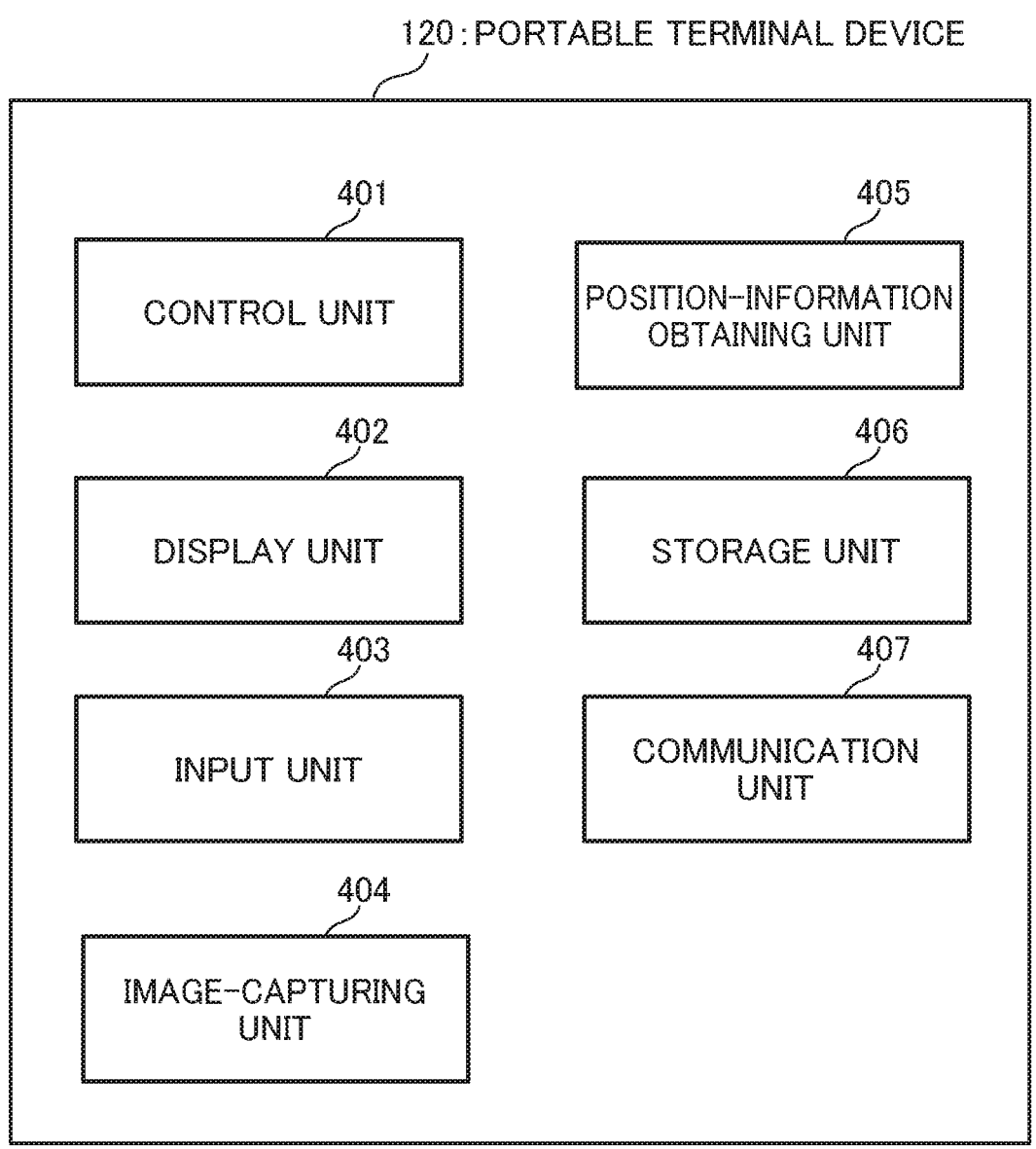
FIG. 4 is a functional block diagram of the portable terminal device according to the embodiment of the present invention.

FIG. 4 shows an example of the functional block diagram of the portable terminal device 120 according to the present invention. The portable terminal device 120 includes a portable-terminal control unit 401, a portable-terminal display unit 402, a portable-terminal input unit 403, an image-capturing unit 404, a position-information obtaining unit 405, a portable-terminal storage unit 406, and a portable-terminal communication unit 407.

The portable-terminal display unit 402 displays information to be presented to the user. The portable-terminal input unit 403 accepts input from the user. The image-capturing unit 404 captures a still picture or a moving picture of a real space region. The position-information obtaining unit 405 obtains current position information of the portable terminal device 120.

The portable-terminal storage unit 406 stores reference images, which are images of individual target objects, in association with target-object identification information (IDs) indicating the kinds of the target objects. Although it is assumed that there are multiple kinds of target objects in this embodiment, the operation is possible with only one kind. In the case where there is only one kind of target object, it is not necessary to store the reference image in association with a target-object ID. It is possible to download the reference images from the server 130 to the storage unit 406 of the portable terminal device 120, for example, as included in an acquisition confirmation application. The reference images stored in the portable-terminal storage unit 406 should preferably be updated at a predetermined timing on the basis of information received from the server 130 via the communication unit 407. For example, it is possible to download and update the reference images at the time of updating of an event for awarding a privilege or at regular intervals. By using a web browser as an acquisition confirmation application, the reference images may be downloaded when a website for photographing a viewed image is accessed.

The control unit 401 of the portable terminal device 120 classifies, on the basis of local features about shapes for detecting a target object, whether or not an image of a space captured by the image-capturing unit 404 of the portable terminal device includes one of a plurality of kinds of target objects. If the image is classified as including one of the kinds of target objects, the portable-terminal control unit 401 captures the image classified as including the target object as an acquisition-target-object image and sends the captured acquisition-target-object image to the server 130. Furthermore, it is possible to obtain portable-terminal position information by using the position-information obtaining unit 405 and to send the portable-terminal position information to the server 130 together with the captured image.

Figure 2:
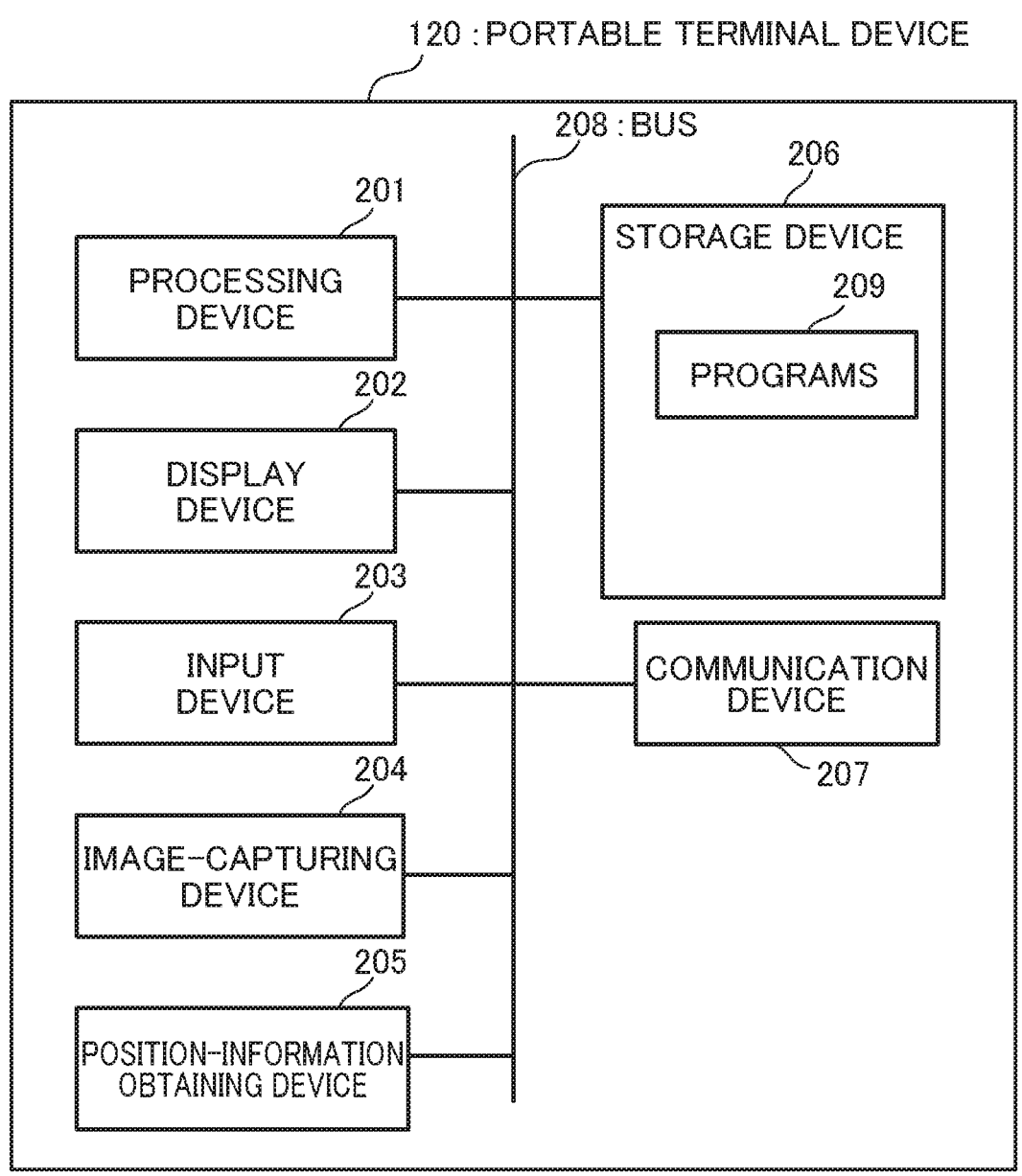
FIG. 2 is a hardware configuration diagram of a portable terminal device according to the embodiment of the present invention.

In this embodiment, the portable-terminal control unit 401 is realized by the programs 209, included in the hardware configuration shown in FIG. 2, being executed by the processing device 201, but may also be realized by preparing an integrated circuit or the like. Furthermore, the portable-terminal display unit 402, the portable-terminal input unit 403, the image-capturing unit 404, the position-information obtaining unit 405, the portable-terminal storage unit 406, and the portable-terminal communication unit 407 are respectively realized by the individual hardware of the display device 202, the input device 203, the image-capturing device 204, the position-information obtaining device 205, the storage device 206, and the communication device 207 shown in FIG. 2, but may also be realized by the programs 209 being executed by the processing device 201, etc. so as to cooperate with the individual hardware.

Figure 5:
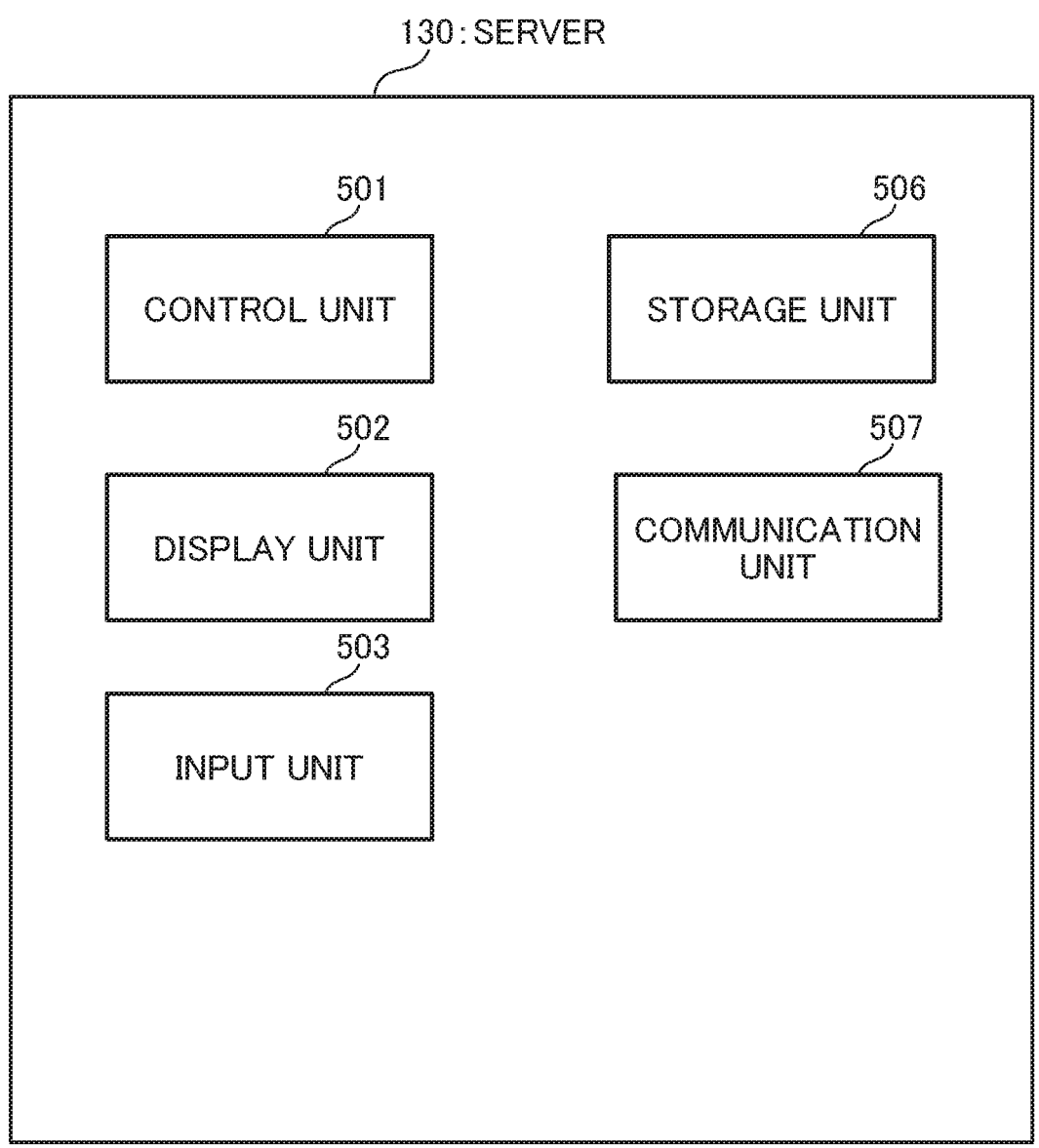
FIG. 5 is a functional block diagram of the server according to the embodiment of the present invention.

FIG. 5 shows an example of the functional block diagram of the server 130 according to the present invention. The server 130 includes a server control unit 501, a server display unit 502, a server input unit 503, a server storage unit 506, and a server communication unit 507.

The server display unit 502 displays information to be presented to a user, such as a server administrator. The server input unit 503 accepts input from the user. The server storage unit 506 stores reference images, which are images of target objects, as well as image features of the target objects, in association with target-object IDs. In the case where there is only one kind of target object, the reference image and image features need not be stored in association with a target-object ID. Furthermore, the server storage unit 506 also stores image features for the individual target objects in association with target-object IDs.

The server control unit 501, in response to a request from the portable terminal device 120, sends the reference images stored in the storage unit 506, together with the target-object IDs associated therewith, to the portable terminal device 120 via the communication unit 507. Furthermore, it is possible to read the reference images from the storage unit 506, send the reference images to the portable terminal device 120, and update the reference images in the portable terminal device 120 at a predetermined timing, such as the timing at which the reference images are updated.

The server control unit 501, by using the server communication unit 507, receives the acquisition confirmation request sent from the portable terminal device 120, determines, on the basis of image features of one of a plurality of kinds of target objects, a feature correlation level of a corresponding acquired target-object image in relation to that kind of target object, and classifies whether or not the acquired target-object image is an image including the kind of target object. The server control unit 501 may further classify whether or not the acquired target-object image is an illegitimately acquired image. In the case where the acquired target-object image is classified as including the target object and as not being an illegitimately acquired image, considering that the acquisition of the target object by the user has been confirmed, a corresponding privilege or the like is awarded.

In this embodiment, the server control unit 501 is realized by the programs 309, included in the hardware configuration shown in FIG. 3, being executed by the processing device 301, but may also be realized by preparing an integrated circuit or the like. Furthermore, the server display unit 502, the server input unit 503, the server storage unit 506, and the server communication unit 507 are respectively realized by the individual hardware of the display device 302, the input device 303, the storage device 306, and the communication device 307 shown in FIG. 3, but may also be realized by the programs 309 being executed by the processing device 301, etc. so as to cooperate with the individual hardware.

Figure 6:
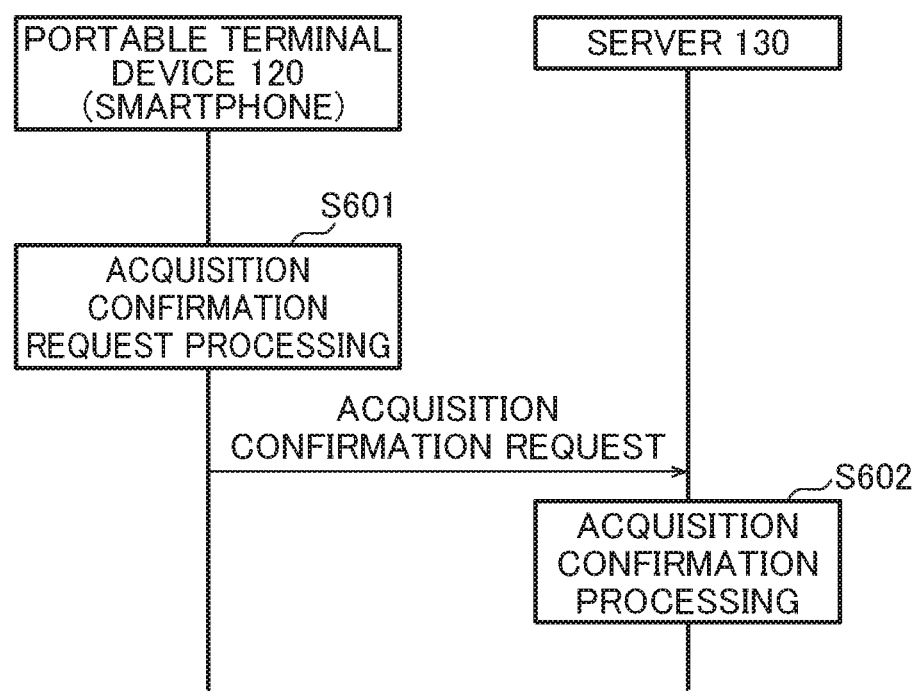
FIG. 6 is a flowchart showing information processing according to the embodiment of the present invention.

Next, FIG. 6 shows a flowchart of the operation of the portable terminal device 120 and the server 130 in this embodiment. This embodiment will be described in the context of an example where the user of a smartphone acting as the portable terminal device 120 is required to purchase and acquire one of products serving as a plurality of kinds of target objects in order to acquire an item in an online game that the user is playing. Here, since items that are awarded in the online game vary among the individual kinds of products, it is necessary to identify which product the user has acquired.

The user actually visits a shop where products designated as targets are sold, purchases and acquires one of the products, captures an image of the acquired product by using the portable terminal device 120, and sends the captured image to the server 130. The server classifies whether the acquired product is one of the plurality of kinds of target products, and when it is determined that the product in the captured image is a certain one of the plurality of kinds of target products, it is acknowledged that the user has acquired that product, and an item corresponding to the product kind is distributed to the game account of the user. The following specifically describes the operations in these processing steps.

In this embodiment, first, the user downloads and installs an acquisition confirmation application in the portable terminal device 120 as one of the programs 209, and visits one of the shops to purchase a product. When the acquisition confirmation application in the portable terminal device 120 is activated by the user in order to capture an image of the acquired product, the portable terminal device 120 starts acquisition-confirmation-request processing (S601). In the acquisition-confirmation-request processing, the control unit 401 of the portable terminal device 120 captures an image including the product by using the image-capturing unit 404 and captures the image as an acquired target-object image, and sends an acquisition confirmation request including this acquired target-object image to the server 130 via the communication unit 407.

The server 130 receives the acquisition confirmation request and executes acquisition confirmation processing (S602). In the acquisition confirmation processing, the server 130 classifies whether the product in the image captured by the user is one of the plurality of kinds of products for which privileges are to be awarded.

Figure 7:
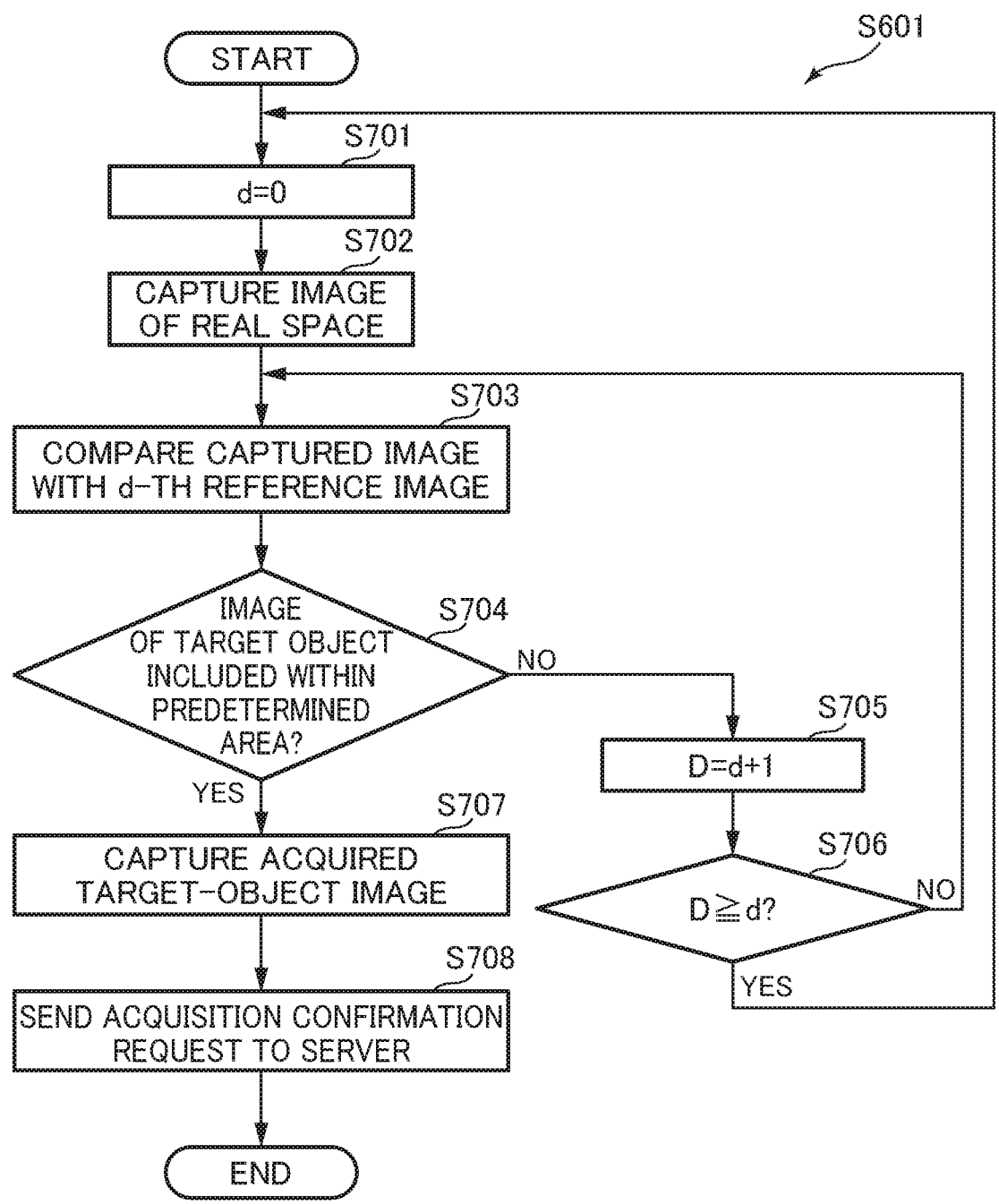
FIG. 7 is a flowchart showing information processing by the portable terminal device according to the embodiment of the present invention.

FIG. 7 more specifically shows the operation in the acquisition-confirmation-request processing (S601) in this embodiment. When the acquisition confirmation application in the portable terminal device 120 is activated by the user, the acquisition-confirmation-request processing S601 is started.

The portable-terminal control unit 401 sets a counter d for reference images to 0 (S701). In this embodiment, the storage unit 406 of the portable terminal device 120 stores reference images in association with individual target-object IDs of D kinds of target objects (products) for which privileges are to be awarded, and it is classified, on the basis of the reference images, whether or not the image captured by the user includes a product that is a target object. For example, the reference images are used for comparison in order of the target-object IDs thereof.

The user attempts to capture an image of the acquired product with the image-capturing unit 404 of the portable terminal device 120 directed toward the product. The image-capturing unit 404 captures an image of a space in the direction in which the image-capturing unit 404 is directed (S702). The image that is captured is preferably a frame of a moving picture, but may be an image captured by photographing a still picture. Then, the captured image of the space captured by the image-capturing unit 404 is compared with the d-th ($0 \leq d < D$) reference image among the reference images stored in the storage unit 406 (S703), and it is classified whether or not the target object associated with the reference image is captured within a predetermined area in the image of the captured space (S705).

In this embodiment the comparison between the reference images and the image of the space captured by the image-capturing unit 404 is executed on the basis of local features about shapes. Here, the shapes include not only the shape of the product but also the shapes of characters and graphics, such as a logo and product name printed on the product. By using local features, it is possible to classify, at high speed, whether or not a product is included in a captured image. The local features are preferably calculated in advance and stored in advance in the storage unit 406.

Here, since whether or not a target object is included in an image is roughly classified by using local features, even in the case where another target object that is similar to the target object in the reference image being used for comparison or an object that is not a target object is included in the image, there is a possibility that the target object in the reference image being compared is classified as being included in the image. In the present invention, the possibility of such incorrect classification in the classification using local features is accepted. A region estimated as including a target object is captured in an image is identified at high speed by using local features, whereby the subject for performing computation using feature correlation levels for performing more accurate identification is limited, thereby reducing the amount of computation. This enables high-speed identification of the kind of a target object.

In this embodiment, the user is guided to move the position and angle of the portable terminal device 120 so that an image of the product will be captured within a predetermined area, thereby limiting the area in which an image of the product is captured within that predetermined area. In this manner, the position and size of the product in the captured image are geometrically normalized, which serves to reduce the amount of information processing for the subsequent identification of the product kind.

The predetermined area within which an image of the product is to be captured is defined to be an area smaller than the entire area in which it is possible to capture an image by the image-capturing unit 404, and an image of the product is captured within the predetermined area while simultaneously capturing an image of a region surrounding the product. The image of the surrounding region can be utilized for the detection of an illegitimately acquired target-object image (S907), which will be described later.

In the case where the predetermined area in the image of the captured space is classified as not including an image of the target object in the d-th reference image (S704), the counter d is incremented (S705), and it is classified whether the captured image has been compared with the reference images of all D kinds of target objects for which the classification is to be performed (S706). In the case where the classification has not been performed for all, it is classified whether the captured image includes the target object in the next reference image (S703 and S704). In the case where it is determined that the captured image has been compared with all the reference images (S706), the counter d is reset (S701), an image of a new space is captured (S703), and comparison of this captured image against the reference images is executed. The processing in S701 to S706 is executed repeatedly until the predetermined area in the image of the captured space is classified as including the target object in one of the reference images.

Figure 8A:
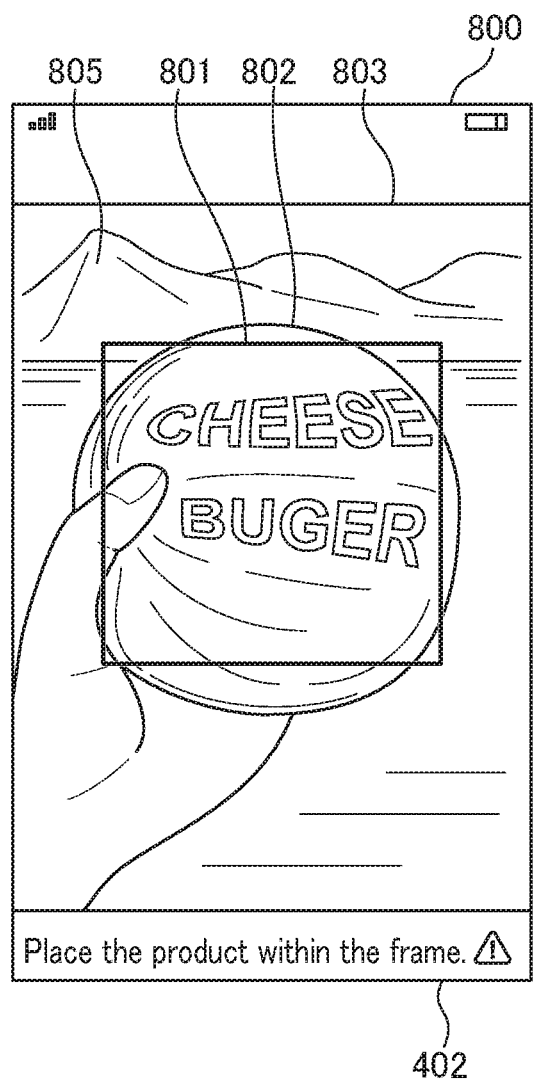
FIG. 8A is an illustration showing an example of displayed screen according to the embodiment of the present invention.

FIG. 8 shows, as an example, a display screen 800 of the acquisition confirmation application, displayed on the display unit 402. Hamburgers are chosen as target objects. As shown in FIG. 8A, together with an image of the space captured by the image-capturing unit 404, the display unit 402 displays a frame 801 indicating a predetermined area within which a hamburger 802 serving as a target object is to be accommodated and a message instructing that the target object is to be accommodated within the frame. Here, the display unit 402 displays the entirety 803 of the image-capturing area of the image-capturing unit 404, and the frame 801 defines an area smaller than the entire area. Thus, when the hamburger 802 is accommodated within the frame 801, a surrounding image 805 of the hamburger 802 is displayed in the area outside the frame 801. Upon being instructed to accommodate the hamburger within the frame 801, the user moves the portable terminal device 120.

The classification processing using local features for classifying whether or not an image of a target object in a reference image is included within a predetermined area in an image of a captured space (S703 and S704) can be realized, for example, by employing key point matching techniques using ORB (Oriented FAST and Rotated BRIEF) features. Specifically, characteristic points (key points) that serve as local features in the reference images are detected in advance and stored in the storage unit 406 as a part of the acquisition confirmation application. Then, the prestored characteristic points (key points) in a reference image are superimposed in the predetermined area (frame 801), and the predetermined area in the image of the captured space is classified as including an image of the target object in the reference image in the case where the characteristic points in the image captured by the image-capturing unit 404 overlap the characteristic points superimposed in the predetermined area. There is no need for perfect overlapping between the characteristic points in the reference image and the characteristic points in the captured image. For example, it is possible to classify the predetermined area as including an image of the target object in the case where a predetermined number of characteristic points overlap within a predetermined range of displacements.

When the user has moved the portable terminal device 120 to successfully accommodate the target object within the predetermined area, the predetermined area in the image of the captured space is classified as including an image of the target object in the reference image (S704), and the image including the target object captured within the predetermined area and also including a surrounding region thereof is captured as an acquired target-object image (S707). In this case, to capture an acquired target-object image is to store a captured image in the storage unit 406 for the purpose of the subsequent processing. Since the processing for capturing an acquired target-object image is executed by each portable terminal device, even in the case where a large number of acquisition confirmation requests are issued simultaneously, loads are distributed to the individual portable terminal devices, and thus server load can be reduced.

Figure 8B:
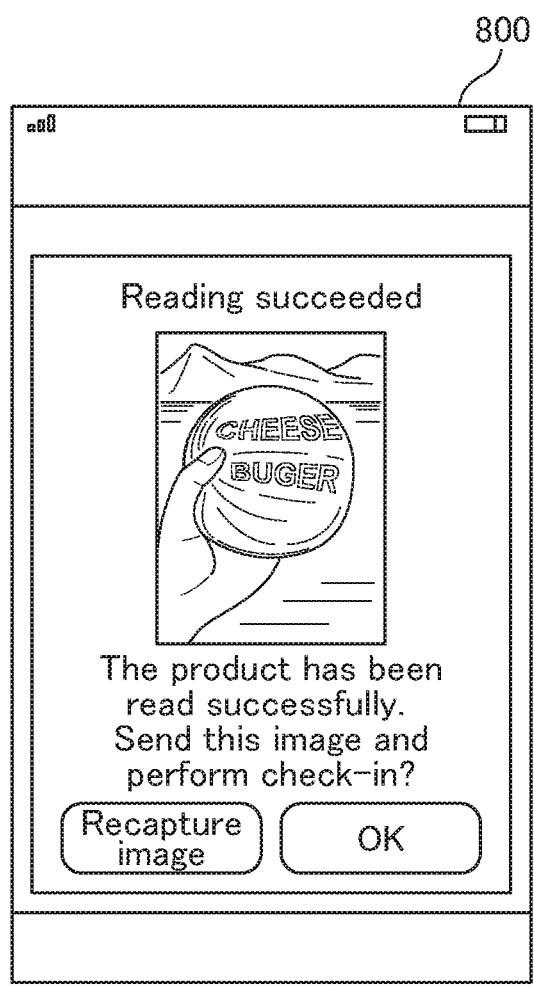
FIG. 8B is an illustration showing an example of a displayed screen according to the embodiment of the present invention.

As shown in FIG. 8B, the display unit 402 displays a message for querying whether to send the acquired target-object image to the server and send an acquisition confirmation request or to photograph an image again, as well as a message for notifying the user that the acquired target-object image has been successfully captured. In the case where the input unit 403 receives an input for photographing an image again, the processing returns to S701. In the case where the input unit 403 receives an input for sending an acquisition confirmation request to the server 130, the control unit 401 of the portable terminal device 120 sends the acquisition confirmation request to the server 130 via the network 110 by using the communication unit 407 (S708). The acquisition confirmation request includes a user ID for identifying the user, as well as the acquired target-object image.

In this embodiment, whether or not an image of a target object is included within a predetermined area is classified by comparing a captured image with predetermined reference images of target objects. However, for a plurality of kinds of target objects having common features, the classification may be performed on the basis of data representing features indicating the common features. In this case, all target objects having the common features are detected. Which of the target objects is included in an acquired target-object image is identified through processing that will be described later.

Figure 9:
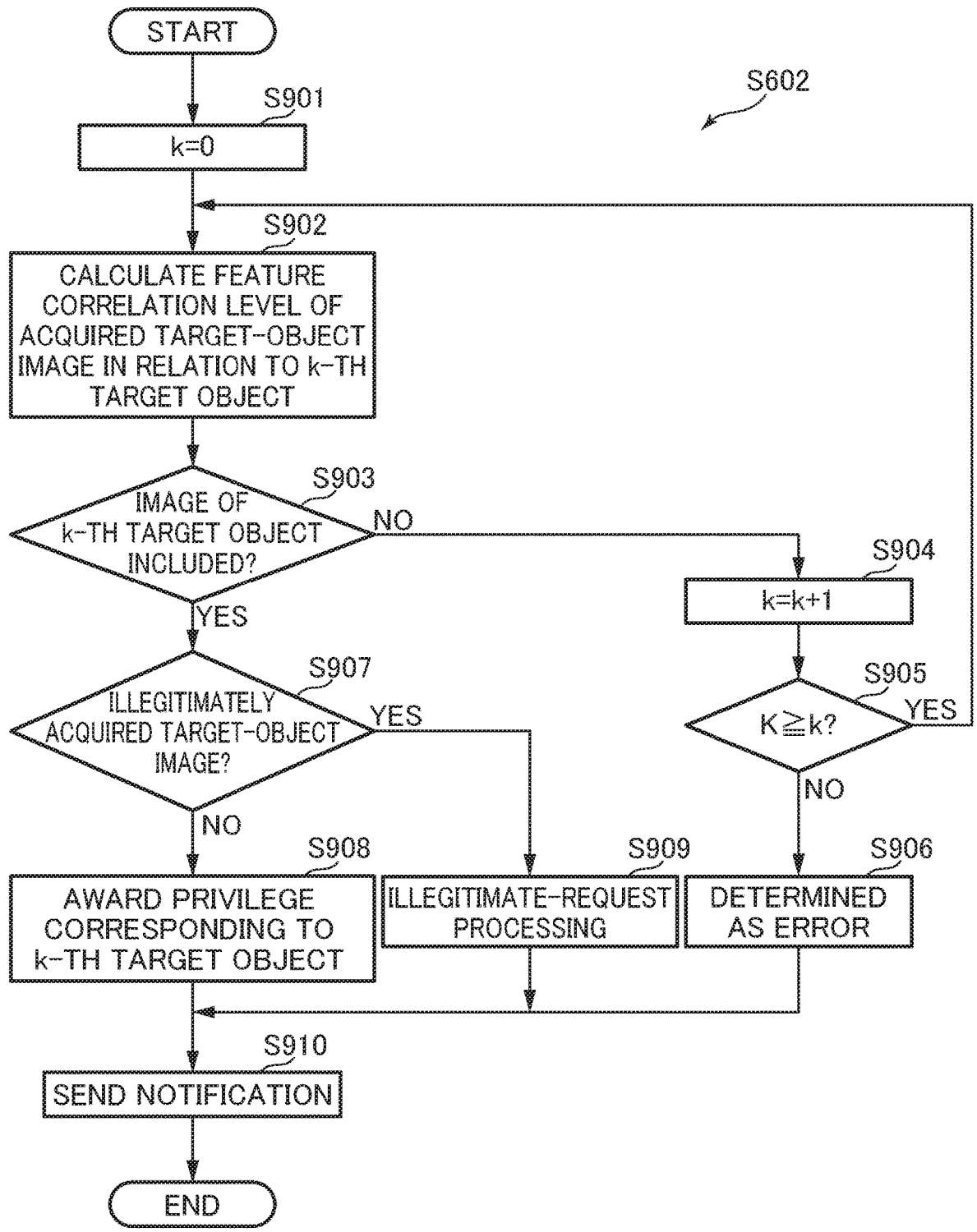
FIG. 9 is a flowchart showing information processing by the server according to the embodiment of the present invention.

Next, the specific processing in the acquisition confirmation processing (S602) executed by the server 130 will be described with reference to a flowchart shown in FIG. 9. In this embodiment, a feature correlation level of the acquired target-object image in relation to the k-th kind of target object is determined on the basis of the image features of the reference image of the k-th target object (S902), and it is classified whether or not the product included in the acquired target-object image is one of the kinds of target products on the basis of the determined feature correlation level (S903). Then, it is classified whether the image has not been illegitimately tampered with and whether or not the image is an illegitimate image such as a copy of an image captured by another user (S907). In the case where one of the kinds of target objects is included in the acquired target-object image and the acquired target-object image is not an illegitimate image, a privilege corresponding to that kind is awarded to the user (S908). These processing steps will be described below in detail.

The server control unit 501 sets a counter k for the kinds of target objects to 0 (S901). In this embodiment, the storage unit 506 stores individual singular features and non-singular features about the plurality of kinds of target objects for which privileges are to be awarded, in association with the target-object IDs of the individual target objects, and it is classified sequentially whether one of the target objects is included in an image captured by the user. Although both the singular features and the non-singular features are defined uniquely to each target object here, it is possible to define only singular features uniquely to each target object while sharing non-singular features among all the kinds. The target objects for comparison in S902 and S903 may be used, for example, in order of the numbers of the target-object IDs.

Singular features are quantities indicating features that are suitable for the identification of the kind of a target object, and non-singular features are quantities indicating features that are not suitable for the identification of the kind of the target object. In this embodiment, the singular features and the non-singular features are features about the colors of images representing target objects. Here, the singular features are defined in the form of a table including one or more sets of RGB values characteristic of a target object among the RGB values of the individual pixels of an image representing the target object. For example, it is possible to create a table by extracting, from a captured image of a target object, the RGB values of pixels considered as being characteristic and the RGB values of pixels considered as not being characteristic as a result of viewing. Although this table may be created on the basis of the reference image of each target object, since the RGB values in a target-object image vary depending on the color, etc. of the illumination at the time of image capturing, it is preferable to create a plurality of tables including singular features on the basis of a plurality of images captured under various illumination conditions.

As an example, regarding the case where product names are printed on the paper wrappers of hamburgers serving as target objects, the case where the colors of the product name characters vary among the individual product kinds but the background color of the paper wrappers is common will be considered. In this case, a singular-feature table including RGB values representing character colors specific to each product is created, and a non-singular-feature table including RGB values representing the background color is created. Furthermore, since the character color of a certain product differs from the character color of another product, the RGB values representing the character color of the other product can be included in the non-singular-feature table for that certain product. Since the character colors for products other than the certain product are colors not included in that product, it is possible to reduce the probability of incorrect product identification by including such features in the non-singular features.

In this embodiment, it is assumed that the color of the characters of the product name "CHEESE BURGER" is green, the color of the characters of the product name "HAMBERGER" is violet, and the background color of the paper wrappers for both CHEESE BURGER and HAMBERGER is brown. Tables 1 and 2 show the singular-feature table and the non-singular-feature table for CHEESE BURGER in this case.

TABLE 1

| ID | R, G, B |
|----|---------|
| 0  | 131, 150, 87 |
| 1  | 136, 162, 101 |
| 2  | 122, 150, 87 |
| ... | ... |
| N  | 83, 93, 32 |

TABLE 2

| ID | R, G, B |
|----|---------|
| 0  | 107, 71, 54 |
| 1  | 117, 79, 60 |
| 2  | 57, 35, 22 |
| ... | ... |
| M  | 192, 159, 79 |

Table 1 is a table representing the singular features of CHEESE BURGER. For example, (131, 150, 87) for ID=0 is a set of RGB values representing green, which is used as the character color of CHEESE BURGER. Since the RGB values for the same printed green color in captured images vary depending on the illumination conditions, a plurality of other sets of RGB values representing green are also included. Table 2 is a table representing the non-singular features of CHEESE BURGER. For example, (107, 71, 54) for ID=0 is a set of RGB values representing brown, which is common to the paper wrappers of both CHEESE BURGER and HAMBERGER. Furthermore, RGB values representing red, which is the character color of HAMBERGER and is not included in the paper wrapper for CHEESE BURGER, may be included.

The server control unit 501 determines a feature correlation level of an acquired target-object image in relation to a target object on the basis of these singular features and non-singular features of the target object. In this embodiment, the area ratio between singular-feature portions and non-singular-feature portions extracted on the basis of the singular features and non-singular features of a target object is considered as the feature correlation level in relation to that target object.

First, the color differences between all the RGB values in the tables of the singular features and non-singular features of the target object and the RGB values of the individual pixels in the acquired target-object image are calculated. In the case where the table including the RGB values having the least color difference from the RGB values at a certain pixel is the singular-feature table, the pixel is considered as a singular-feature portion (singular-feature pixel). In the case where the table is the non-singular-feature table, the pixel is considered as a non-singular-feature portion (non-singular pixel). Then, the area ratio between the extracted singular-feature portions and non-singular-feature portions is calculated.

For the purpose of the calculation of color differences, the Godlove color-difference formula (Godlove, I. H.: Improved Color-Difference Formula, with Applications to the Perceptibility and Acceptability of Fadings, Journal of the Optical Society of America, 41(11), pp. 760-770, (1951)) or CIE 2000 (Luo, M. R., Cui, G., & Rigg, B., "The development of the CIE 2000 colour-difference formula: CIEDE2000", Color Research & Application, Volume 26, Issue 5, October 2001, pp. 340-350, DOI: 10.1002/col.1049), which represent color distance systems in color spaces having uniformity, may be used. For example, the Godlove color-difference formula $\Delta_{godlove}$, generally known for the distance in the HSV space, can be defined as follows.

{Eq. 1}

$$\Delta_{godlove} := \frac{2S_1 S_2 \left(1 - \cos\left(2\pi \frac{|H_1 - H_2|}{100}\right)\right) + (|S_1 - S_2|)^2 + (4|V_1 - V_2|)^2}{2} \quad (1)$$

Figure 10:
FIG. 10 is an illustration in which characteristic portions and non-characteristic portions of a target object are visualized according to the embodiment of the present invention.

FIG. 10 shows an illustration in which the singular-feature portions and the non-singular-feature portions determined through the processing according to this embodiment are visualized. Here, the singular-feature portions (pixels) are indicated with white, and the non-singular-feature portions (pixels) are indicated with black. As shown in the figure, it will be understood that portions having RGB values close to the RGB values included in the singular-feature table, i.e., character portions having colors characteristic of the target object, are extracted as singular-feature portions, and that portions having RGB values close to the RGB values included in the non-singular-feature table, i.e., background portions not having colors characteristic of the target object, are extracted as non-singular-feature portions. For example, the area ratio between the extracted singular-feature portions and non-singular feature portions, serving as a feature correlation level, is the area ratio between the white portions and the black portions in FIG. 10.

Instead of using the non-singular-feature table, a portion may be classified as being a singular-feature portion if the differences between the RGB values in the singular-feature table are within a threshold while otherwise classifying the portion as a non-singular-feature portion. As described earlier, however, even in the case where images of the same kind of target object are captured, the RGB values of the individual pixels in the captured images vary depending on the illumination conditions. Thus, the possibility of incorrect classification increases if whether or not a portion is a singular-feature portion is classified on the basis of only whether the portion falls within a predetermined range of the singular features. For example, if the classification about an acquired target-object image photographed under illumination that is close to green, which is a characteristic color, all the pixels exhibit colors close to the singular features, which results in the risk that all the pixels might be classified as being singular feature portions.

Meanwhile, it becomes possible to perform classification more accurately by performing relative classification as to whether a portion is closer to a singular feature or a non-singular feature by also using the non-singular feature table, as in this embodiment. For example, if non-singular features have been extracted on the basis of an image captured under green illumination, even with an acquired target-object image captured under green illumination, the pixels representing a greenish background color exhibit colors close to the RGB values included in the non-singular-feature table, and thus the pixels can be classified as being non-singular-feature portions. It is possible to further improve the accuracy by creating such tables on the basis of images captured under various illuminations. It is also possible to further improve the accuracy by including colors not included in the target object as non-singular features.

In S903, whether or not the captured image includes the k-th target object is classified on the basis of the determined feature correlation level of the acquired target-object image in relation to the k-th target object. In the case where this feature correlation level falls within a range predefined for the target object, the acquired target-object image is classified as including CHEESE BURGER.

Then, in the case where the captured image is classified as including the k-th target object, the processing proceeds to fraud detection (S907). In the case where the captured image is classified as not including the k-th target object, the counter k is counted up (S904), and if the classification has not been performed for all the kinds K (S905), the processing returns to S902 to execute the classification processing again for the next kind. In the case where the captured image is not classified as including a target object even after performing the classification for all the kinds K, since none of the kinds of target objects has been detected, the result is determined as an error (S906), and an error message is sent to the portable terminal device 120 to report that no target object has been detected (S910).

In the case where the captured image is classified as including the k-th target object, it is classified whether or not the image is an illegitimately acquired target-object image (S907). In this fraud detection, it is detected whether the acquired target-object image has been illegitimately tampered with and whether the acquired target-object image has been acquired in an illegitimate way such as copying an image captured by another user. Various methods for verifying whether or not an image has been illegitimately tampered with are known, as described in A. E. Dirik and N. Memon, "Image tamper detection based on demosaicing artifacts", 2009 16th IEEE International Conference on Image Processing (ICIP), Cairo, 2009, pp. 1497-1500 and Minati Mishra, Flt. Lt. Dr. M. C. Adhikary, "Digital Image Tamper Detection Techniques—A Comprehensive Study", International Journal of Computer Science and Business Informatics, Vol. 2, No. 1. ISSN: 1694-2108, June 2013. In the present invention, any method for verifying whether or not an image has been illegitimately tampered with may be adopted.

In the case where the viewed image is classified as not having been illegitimately tampered with, it is classified, on the basis of an image of the surrounding portion of the target object included in the acquired target-object image, whether or not the image has been acquired in an illegitimate way such as copying an image captured by another user. Images including surrounding portions of a target object do not become completely the same image if the times when the images are photographed vary because passersby are included in the images or the positions of shadows change. Furthermore, since the surrounding regions of a product vary among individual image-capturing places, the surrounding regions vary among individual captured images. In the present invention, it is possible to store and accumulate acquired target-object images included in acquisition confirmation requests already classified as being valid acquisition confirmation requests in the server storage unit 506 and to classify whether or not an acquired target-object image subject to the classification is an image acquired by copying by comparing the acquired target-object image with the already confirmed acquired target-object images. The acquired target-object image is classified as being an illegitimate image if the similarity between these images is higher than a certain level.

This fraud detection based on surrounding images can be realized, for example, by the method disclosed in Patent Literature 1 (Japanese Patent Publication No. 6181893). In this embodiment, since an image of a target object is captured within a predetermined area that is smaller than the entire area in which it is possible to capture an image by the image-capturing unit 404, an image of a surrounding region of the target object is also captured. Thus, it is possible to perform fraud detection by incorporating the fraud detection method disclosed in Patent Literature 1.

In the case where the image is classified as not being an illegitimately acquired target-object image in the illegitimately-acquired-target-image detection (S907), assuming that the acquisition of the k-th target object by the user has been confirmed, processing for awarding a privilege corresponding to the k-th target object is executed (S908), and a notification indicating that the privilege has been awarded is sent to the portable terminal device 120 (S910). In the case where the image is classified as being an illegitimately acquired target-object image, processing for the illegitimately acquired target-object image is executed (S909), and a notification indicating that the image has been classified as being an illegitimately acquired target image is sent to the portable terminal device 120 (S910).

In this embodiment, matching processing is performed by using two kinds of features: specifically, local features, which are features that are robust against rotation and movement, are used for the detection of a target-object region where a target object is included in a captured image, and global color features are used for target-object identification to determine the kind of the target object included in the detected target-object region from among variations. This makes it possible to identify a large variety of target objects at high speed and with high accuracy. It becomes possible to simultaneously realize identification accuracy and noise resistance by combining local features, which are robust against changes and noise but does not provide sufficiently high identification accuracy, and global color features, which provide high identification accuracy but are weak to changes and noise.

In particular, for example, in the case where target objects are products wrapped with paper wrappers, since a lot of noise such as deformation due to folding of the paper wrappers as well as stains is included, it is not possible to accurately determine the product kind with existing feature matching alone. However, by adopting this embodiment, it is possible to identify the kind of a target object with high accuracy and at high speed even in the case where a lot of noise is included.

In this embodiment, if the acquired target-object image is classified as including the k-th target object in S903 on the basis of the feature correlation level of the acquired target-object image in relation to the k-th target object, it is determined that an image of the k-th target object was captured. Alternatively, it is possible to calculate feature correlation levels in relation to all the plurality of kinds of target objects and to determine that an image of a target object having the highest correlation is included in the image. For example, it is possible to determine that a target object having the least difference between an area ratio Ck calculated for the acquired target-object image and a predetermined value Ak stored in advance for the k-th target object is included in the acquired target-object image.

Although color features are adopted as image features used to obtain a feature correlation level in S902 in this embodiment, a feature correlation level may be determined by using shape features. For example, it is possible to define a window of N×N pixels, sequentially apply this window to the individual pixels of a reference image to extract a shape pattern, and define shape features on the basis of this shape pattern.

Figure 11:
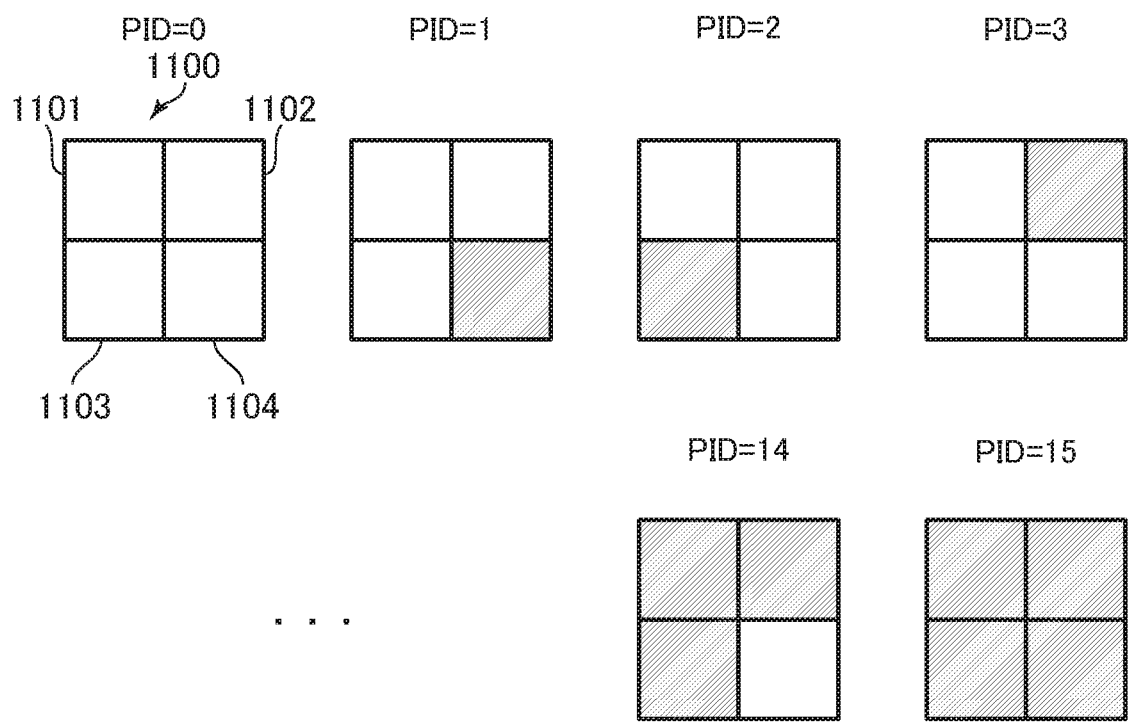
FIG. 11 is an illustration showing the concept of a window according to the embodiment of the present invention.

For simplicity of explanation, a description will be given in the context of an example where N is set to be 2 to deal with black-and-white images. A window 1100 of 2×2 pixels is defined, as shown in FIG. 11. Since each pixel is either white or black, the number of patterns of the pixels included in this window is $2^4$, and identification numbers PID (0 to 15) are assigned to the individual patterns. For example, PID=0 is assigned to the pattern in which all the pixels (1101 to 1104) are white, PID=1 is assigned to the case where only the lower right pixel (1101) is black, and PID=15 is assigned to the case where all the pixels are black.

Figure 12A:
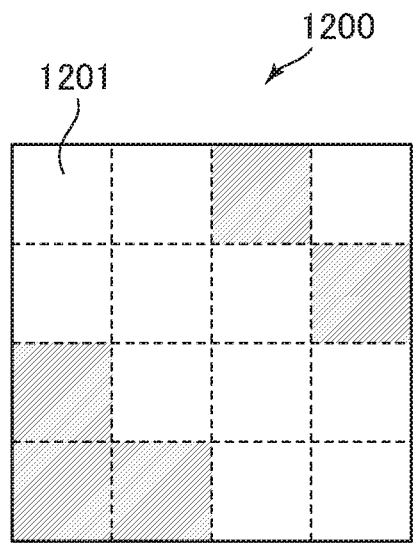
FIG. 12A is an illustration schematically showing a shape-feature extracting method according to the embodiment of the present invention.
Figure 12B:
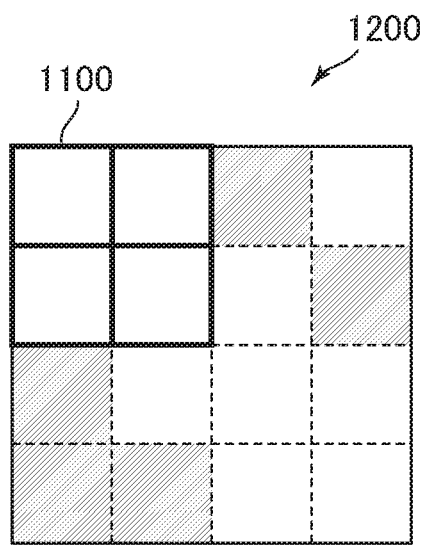
FIG. 12B is an illustration schematically showing the shape-feature extracting method according to the embodiment of the present invention.
Figure 12C:
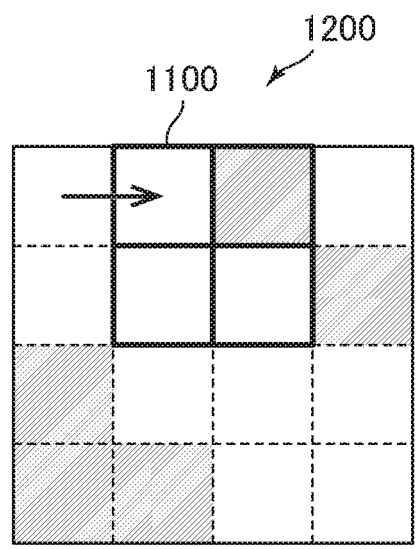
FIG. 12C is an illustration schematically showing the shape-feature extracting method according to the embodiment of the present invention.
Figure 12D:
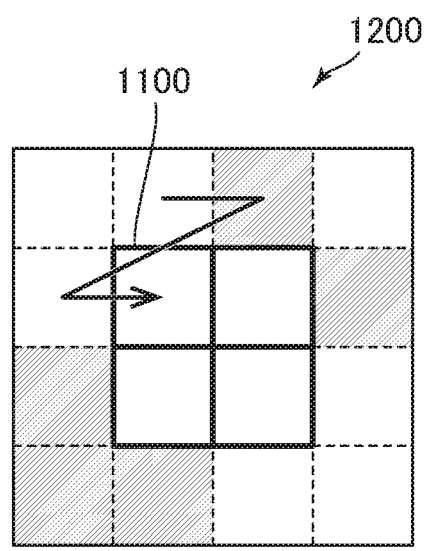
FIG. 12D is an illustration schematically showing the shape-feature extracting method according to the embodiment of the present invention.

Then, the window 1100 is applied to a reference image 1200 shown in FIG. 12A. First, the upper left pixel 1101 of the window 1100 is aligned with the top left pixel 1201 of the reference image 1200 (FIG. 12B) to extract a pattern of the top left 2×2 pixels of the reference image 1200, and a counter for the PID of the extracted pattern is counted up by 1. Here, since the top left 2×2 pixels of the reference image 1200 are all white, a counter CPID_0 for PID=0 is incremented by 1. As shown in FIGS. 12C and 12D, the window 1100 is shifted pixel by pixel to execute this processing for all the pixels of the reference image, and the number of patterns corresponding to each PID is individually counted to obtain counters CPID_0 to CPID_15. Then, a shape histogram serving as image features about this kind of target object is obtained by using these counters CPID_0 to CPID_15 as bins.

A shape histogram is also created for the acquired target-object image by using this window 1100. Then, the difference between the shape histogram of the acquired target-object image and the shape histogram of the reference image is calculated, and the difference is used as a feature correlation level (S902). Then, the acquired target-object image is classified as including the target object in the case where the difference value serving as the feature correlation level falls within a predetermined range, and is classified as not including the target object in the case where the difference value falls outside the range (S903). Here, correlation is higher as the difference value serving as the feature correlation level is lower.

Furthermore, as a modification, the kind of target object acquired by the user may be identified in advance. In this case, confirmation processing as to whether an image of a target object is captured within the predetermined area may be executed on the basis of only local features of the identified target object, a target-object ID identifying the designated kind of target object may be included in an acquisition confirmation request that is sent to the server 130, and the server 130 may classify whether or not the acquired target-object image includes the target object, identified on the basis of the target-object ID, on the basis of only the image features of the target object. Thus, it is possible to realize processing at higher speed.

Furthermore, a limit may be set for the number of times a single user is allowed to acquire one kind of target object at a predetermined shop and to perform check-in processing. In this case, when the portable terminal device 120 sends a confirmation request, position information obtained by the position-information obtaining unit 405 when the acquired target-object image was captured is included in the acquisition confirmation request, and when the server 130 awards a privilege, it is confirmed whether the user has already performed a check-in for the kind of target object on the basis of an image captured in the vicinity of the position. In the case where the user has already performed a check-in, the privilege is not awarded. In the case where the user has not performed a check-in, after awarding the privilege, information indicating that the user has already performed a check-in at the position in the server storage unit 506.

In the case where there is one category for a plurality of kinds of target objects having common features, for example, at the start of the acquisition confirmation processing (S602), it is possible to determine, on the basis of the common features, such as colors, that the target object included in the acquired target-object image is one in that category, and to execute the processing in and after S701 only for the target objects in the category. This makes it possible to reduce the number of target objects used for comparison in the case where there are a large number of target objects, which makes it possible to increase the processing speed.

Although this embodiment has been described in the context of the case where the server 130 executes the acquisition confirmation processing (S602), the portable terminal device 120 may execute the acquisition confirmation processing. This can be realized, for example, by storing, in the storage unit 406 of the portable terminal device 120, singular features and non-singular features individually for the plurality of kinds of target objects for which privileges are to be awarded, in addition to the reference images of the target objects, in association with target-object IDs of the individual target objects. Preferably, these items of information should be regularly obtained from the server 130 and updated. The portable terminal device 120 does not send an acquisition confirmation request to the server 130 after an image of a space including a target object captured within the predetermined area as well as a surrounding region thereof is captured as an acquired target-objet image in S707. Instead of the server 130, the portable terminal device 120 executes the processing in S901 to S909 as the acquisition confirmation processing on the basis of the captured acquired target-object image, which makes it possible to confirm that the user has acquired the target object. Without having to execute the notification sending (S910), it is possible to display, on the display unit 402 of the portable terminal device 120, a message such as a message indicating that a privilege has been awarded or a message indicating that the confirmation request has been classified as being illegitimate as a result of confirmation as to whether or not the user has obtained the target object.

The processing or operation described above may be modified freely as long as no inconsistency arises in the processing or operation. Furthermore, the embodiments described above are examples for explaining the present invention, and the present invention is not limited to those embodiments. The present invention may be embodied in various forms not departing from the gist thereof. Furthermore, the advantages described in the context of the embodiments are merely a list of most preferred advantages arising from the present invention, and the advantages of the present invention are not limited to those described in the context of the embodiments.

REFERENCE SIGNS LIST

100 Acquisition confirmation system
110 Network
120 Portable terminal device
130 Server
201 Processing device
202 Display device
203 Input device
204 Image-capturing device
205 Position-information obtaining device
206 Storage device
207 Communication device
208 Bus
209 Programs
301 Processing device
302 Display device
303 Input device
306 Storage device
307 Communication device
308 Bus
309 Programs
401 Control unit
402 Display unit
403 Input unit
404 Image-capturing unit
405 Position-information obtaining unit
406 Storage unit
407 Communication unit
501 Control unit
502 Display unit
503 Input unit
506 Storage unit
507 Communication unit
800 Display screen
801 Frame
802 Target object
803 Entire image
805 Surrounding image
1100 Window
1101 Pixel
1102 Pixel
1103 Pixel
1104 Pixel
1200 Reference image
1201 Pixel

The invention claimed is:

1. A system for confirming that one kind of target object among a plurality of kinds of target objects has been acquired, the system including a portable terminal device and a server, the system being characterized in that:
the portable terminal device
classifies, on the basis of local features about shapes for detecting the plurality of kinds of target objects, whether or not one kind of target object among the plurality of kinds of target objects is included in an image of a space captured by an image-capturing device of the portable terminal device,
if the image is classified as including one kind of target object, captures, as an acquired target-object image, the image classified as including the target object, and
sends the acquired target-object image to the server, and
the server
receives the sent acquired target-object image,
determines, on the basis of image features of one kind of target object among the plurality of kinds of target objects, a feature correlation level of the acquired target-object image in relation to the one kind of target object, and
classifies, on the basis of the determined feature correlation level, whether or not the acquired target-object image is an image in which the one kind of target object is captured,
wherein the image features of the one kind of target object comprise singular features and non-singular features,
wherein the singular features comprise characteristic color values representing colors that are characteristic of the one kind of target object, and the non-singular features comprise non-characteristic color values representing colors that are not characteristic of the one kind of target object,
wherein the feature correlation level is a ratio between an amount of characteristic portions determined as representing the colors characteristic of the one kind of target object and an amount of non-characteristic portions determined as representing the colors not characteristic of the one kind of target object based on the image features of the one kind of target object in the acquired target-object image, and
wherein classifying whether or not the acquired target-object image is the image in which the one kind of target object is captured is determined according to whether or not the feature correlation level falls within a predetermined range.

2. The system according to claim 1, characterized in that the non-singular features include at least either of color values representing colors that are common to the plurality of kinds of target objects and color values not included in the singular features of the one kind of target object and included in the singular features of other kinds of target objects.

3. The system according to claim 1, characterized in that:
the image features of the one kind of target object include a histogram about a shape included in a reference image of that kind of target object, and
the feature correlation level is determined on the basis of the difference between the histogram of the reference image and a histogram about a shape included in the acquired target-object image.

4. The system according to claim 1, characterized in that the classification as to whether or not one kind of target object among the plurality of kinds of target objects is included in an image of a space captured by the image-capturing device of the portable terminal device is classification as to whether or not the one kind of target object is included within a predetermined area in the image of the captured space.

5. The system according to claim 1, wherein one kind among the plurality of kinds of target objects is designated by a user in advance via the portable terminal device.

6. The system according to claim 1, characterized in that the classification as to whether or not the acquired target-object image is an image in which the one kind of target object is captured is performed for each of the plurality of kinds of target objects, and the acquired target-object image is determined as being an image in which a target object having the highest correlation is captured.

7. The system according to claim 1, characterized in that the local features are local features that are common to the plurality of kinds of target objects or local features that are unique to each of the plurality of kinds of target objects.

8. A server that is used in a system for confirming that one kind of target object among a plurality of kinds of target objects has been acquired, the server being characterized in that the server:
- receives, from a portable terminal device, an acquired target-object image classified as including a target object captured by the portable terminal device,
- determines, on the basis of image features of one kind of target object among the plurality of kinds of target objects, a feature correlation level of the acquired target-object image in relation to the one kind of target object, and
- classifies, on the basis of the determined feature correlation level, whether or not the acquired target-object image is an image in which the one kind of target object is captured,
- wherein the image features of the one kind of target object comprises singular features and non-singular features,
- wherein the singular features include characteristic color values representing colors that are characteristic of the one kind of target object, and the non-singular features comprise non-characteristic color values representing colors that are not characteristic of the one kind of target object,
- wherein the feature correlation level is a ratio between an amount of characteristic portions determined as representing the colors characteristic of the one kind of target object and an amount of non-characteristic portions determined as representing the colors not characteristic of the one kind of target object based on the image features of the one kind of target object in the acquired target-object image, and
- wherein classifying whether or not the acquired target-object image is the image in which the one kind of target object is captured is determined according to whether or not the feature correlation level falls within a predetermined range.

9. A method for confirming that one kind of target object among a plurality of kinds of target objects has been acquired, wherein one or more computers are caused to execute:
- a step of classifying, on the basis of local features about shapes for detecting the plurality of kinds of target objects, whether or not one kind of target object among the plurality of kinds of target objects is included in an image of a space captured by an image-capturing device of a relevant portable terminal device,
- a step of capturing, if the image is classified as including one kind of target object, the image classified as including the target object as an acquired target-object image,
- a step of determining, on the basis of image features of one kind of target object among the plurality of kinds of target objects, a feature correlation level of the acquired target-object image in relation to the one kind of target object, and
- a step of classifying, on the basis of the determined feature correlation level, whether or not the acquired target-object image is an image in which the one kind of target object is captured,
- wherein the image features of the one kind of target object comprise singular features and non-singular features,
- wherein the singular features comprise characteristic color values representing colors that are characteristic of the one kind of target object, and the non-singular features comprise non-characteristic color values representing colors that are not characteristic of the one kind of target object,
- wherein the feature correlation level is a ratio between an amount of characteristic portions determined as representing the colors characteristic of the one kind of target object and an amount of non-characteristic portions determined as representing the colors not characteristic of the one kind of target object on the basis of the image features of the one kind of target object in the acquired target-object image, and
- wherein classifying whether or not the acquired target-object image is an image in which the one kind of target object is captured is determined according to whether or not the feature correlation level falls within a predetermined range.

10. A non-transitory, computer-readable medium storing a set of programs for performing the method of claim 9.

11. A method for confirming that one kind of target object among a plurality of kinds of target objects has been acquired, wherein a server is caused to execute:
- receiving, from a portable terminal device, an acquired target-object image classified as including a target object captured by the portable terminal device,
- determining, on the basis of image features of one kind of target object among the plurality of kinds of target objects, a feature correlation level of the acquired target-object image in relation to the one kind of target object, and
- classifying, on the basis of the determined feature correlation level, whether or not the acquired target-object image is an image in which the one kind of target object is captured,
- wherein the image features of the one kind of target object comprise singular features and non-singular features,
- wherein the singular features comprise characteristic color values representing colors that are characteristic of the one kind of target object, and the non-singular features include non-characteristic color values representing colors that are not characteristic of the one kind of target object,
- wherein the feature correlation level is a ratio between an amount of characteristic portions determined as representing the colors characteristic of the one kind of target object and an amount of non-characteristic portions determined as representing the colors not characteristic of the one kind of target object based on the image features of the one kind of target object in the acquired target-object image, and
- wherein classifying whether or not the acquired target-object image is the image in which the one kind of target object is captured is determined according to whether or not the feature correlation level falls within a predetermined range.

12. A non-transitory, computer-readable medium storing a program for performing the method of claim 11.

* * * * *